United States Patent
Effenberger

(10) Patent No.: US 8,931,820 B2
(45) Date of Patent: Jan. 13, 2015

(54) FASTENING DEVICE FOR A CHILD SEAT IN A MOTOR VEHICLE

(75) Inventor: Witali Effenberger, Wendeburg (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 14/343,065

(22) PCT Filed: Aug. 27, 2012

(86) PCT No.: PCT/EP2012/003595
§ 371 (c)(1),
(2), (4) Date: Mar. 11, 2014

(87) PCT Pub. No.: WO2013/034254
PCT Pub. Date: Mar. 14, 2013

(65) Prior Publication Data
US 2014/0217766 A1 Aug. 7, 2014

(30) Foreign Application Priority Data
Sep. 6, 2011 (DE) .......................... 10 2011 112 601

(51) Int. Cl.
*B60N 2/28* (2006.01)
*B60N 2/005* (2006.01)

(52) U.S. Cl.
CPC .............. *B60N 2/005* (2013.01); *B60N 2/2809* (2013.01)
USPC ...................... 296/68.1; 296/65.03; 297/250.1

(58) Field of Classification Search
CPC .................................................... B60N 2/2809
USPC ............... 296/68.1, 65.03; 297/250.1, 216.11
See application file for complete search history.

(56) References Cited

U.S. PATENT DOCUMENTS

| 5,941,600 A | 8/1999 | Ashcroft et al. |
| 6,416,129 B1 * | 7/2002 | Hirota ........................... 297/253 |

(Continued)

FOREIGN PATENT DOCUMENTS

| DE | 101 31 363 | 1/2002 |
| DE | 10 2004 015 647 | 10/2005 |

(Continued)

OTHER PUBLICATIONS

International Search Report Issued for PCT International Application No. PCT/EP2012/003595, mailed Apr. 11, 2013.

(Continued)

*Primary Examiner* — Jason S Morrow
(74) *Attorney, Agent, or Firm* — Pearl Cohen Zedek Latzer Baratz LLP

(57) ABSTRACT

The invention relates to a fastening device for a child seat in a motor vehicle, comprising a one-piece bracket part (4) in the form of a top-tether bracket to be affixed to a support (13) on the backrest (3) of a rear seat. According to the invention, the one-piece bracket part (4) consists of a U-shaped bracket element (6) and of a fitting element (9) connected to the U-legs (7, 8). The fitting element (9) has a connection surface (10) that faces the support (13) when in the installed state, whereby, projecting from the connection surface (10) in the direction of the support (13), there is at least one positioning pin (11) that can be inserted into a diameter-adapted positioning recess (12) of the support (13), and whereby at least one spacer block (14) facing the support (13) is arranged on the connection surface (10) and is offset with respect to the positioning pin (11), and, in the installed state, said spacer block lies against the support (13), and the fitting element (9) can be screwed to the support (13) through said spacer block (14).

11 Claims, 2 Drawing Sheets

(56) References Cited

U.S. PATENT DOCUMENTS

| | | | |
|---|---|---|---|
| 2002/0043836 A1* | 4/2002 | Maciejczyk et al. | 297/250.1 |
| 2003/0184138 A1* | 10/2003 | Haverkamp | 297/254 |
| 2004/0041450 A1* | 3/2004 | Yamaoka et al. | 297/254 |
| 2004/0051356 A1* | 3/2004 | Neelis | 297/253 |
| 2007/0182195 A1 | 8/2007 | Chalhoub | |
| 2007/0194590 A1* | 8/2007 | Bertoli et al. | 296/68.1 |
| 2008/0136223 A1* | 6/2008 | Murphy et al. | 297/216.11 |
| 2008/0136224 A1* | 6/2008 | Malapati et al. | 297/216.11 |
| 2013/0119722 A1* | 5/2013 | Spahn et al. | 297/216.11 |

FOREIGN PATENT DOCUMENTS

| | | |
|---|---|---|
| DE | 10 2005 018 831 | 10/2006 |
| DE | 10 2005 054 299 | 5/2007 |
| DE | 10 2007 003 288 | 7/2008 |
| DE | 10 2008 009 575 | 8/2009 |

OTHER PUBLICATIONS

German Search Report Issued for German Patent Application No. 10 2011 112 601.9, mailed Nov. 24, 2011.

* cited by examiner

FASTENING DEVICE FOR A CHILD SEAT IN A MOTOR VEHICLE

CROSS-REFERENCE TO RELATED APPLICATIONS

This application is a National Phase Application of PCT International Application No. PCT/EP2012/003595, International Filing Date Aug. 27, 2012, claiming priority from German Patent Application No. 10 2011 112 601.9, filed Sep. 6, 2011, which are hereby incorporated by reference.

FIELD OF THE INVENTION

The present invention relates to a fastening device for a child seat in a motor vehicle according to the generic part of claim 1.

BACKGROUND OF THE INVENTION

A prior-art generic fastening device (German patent application DE 10 2008 009 575 A1) has a one-piece bracket part in the form of a so-called "top-tether bracket" to be affixed to a support on the backrest of a rear seat.

Such a fastening device especially serves to secure an upper section of a child seat in that a strap installed there is hooked onto the bracket part by means of a fastening hook. The strap with the hook is referred to as a top tether and such top tethers are used particularly in the United States and Canada in order to fasten child seats.

The prior-art top-tether bracket is a shaped, flat, one-piece sheet-metal part consisting of two fastening sections with a crosspiece between them, whereby the two fastening sections are each joined by welding to the rear support structure of the backrest of the rear seat. Such an installation by means of welding, especially without adjustment aids, is labor-intensive and costly, in addition to which no cover is provided here for the bracket part.

Fastening devices for the same purpose are also known which, however, have complicated multi-component bracket parts (German patent applications DE 10 2004 015 647 A1; DE 2005 054 299 A1).

SUMMARY OF THE INVENTION

The objective of the present invention is to put forward a fastening device for a child seat in a motor vehicle that has a one-piece bracket part, whereby said bracket part can be installed in a simple and reliable procedure.

This objective is achieved in that the one-piece bracket part consists of a U-shaped bracket element and of a fitting element connected to the U-legs, whereby the fitting element has a connection surface that faces the support when in the installed state. Projecting from this connection surface in the direction of the support, there is at least one positioning pin that can be inserted into a diameter-adapted positioning recess of the support. Moreover, at least one spacer block facing the support is arranged on the connection surface and is offset with respect to the positioning pin, whereby, in the installed state, said spacer block lies against the support, and the fitting element can be screwed to the support through said spacer block.

Therefore, the bracket part can be easily installed and precisely positioned in that the positioning pin is inserted into the diameter-adapted positioning recess of the support. Advantageously, the positioning pin is not configured as a cylindrical part but rather with a profile in such a way that, when the positioning pin is inserted, it provides anti-twist protection and also establishes the positional direction of the fitting element already in the first installation step.

Moreover, at least one spacer block facing the support is arranged on the connection surface and is offset with respect to the positioning pin, whereby, in the installed state, said spacer block lies against the support, and the fitting element can be screwed to the support through said spacer block. Thus, the advantage with a spacer block is that only one screwed connection is necessary since the positioning pin also provides additional fixation. The direct contact of the spacer block with the support, particularly at a rear support plate of the backrest of the rear seat, ensures a good force connection and fixation of the fitting element on the support.

In a concrete, easy-to-produce embodiment, the fitting element is a flat-strip metal element out of which the positioning pin has been notched from a lengthwise center area with a rectangular diameter so as to extend approximately at a right angle relative to the connection surface. Such a rectangular positioning pin can be inserted into a matching rectangular hole on the support in order to establish the position and provide anti-twist protection.

On the one-piece fitting element, advantageously in a simple and inexpensive production procedure, the spacer block is drawn as a spacer sleeve out of the material of the fitting element and then affixed to the support by means of a screw in the center. Therefore, it is expressly the case here that no separate spacer sleeve is employed as a spacer which—as an additional part found in similar prior-art embodiments—increases the production cost and entails greater logistical and assembly work.

In a practical manner, when in the installed state, the spacer block or the spacer sleeve is located below the positioning pin on the fitting element.

In another preferred embodiment of the bracket part, a spacer is arranged on the fitting element on the connection surface in the upper section next to the bracket element, whereby said spacer does not project as far from the connection surface as the spacer block and the positioning pin do. In the installed state, this spacer lies against a layer of carpeting on the support, so that, when the entire fitting element is in its installed state, it is held at a distance from the support and from a layer of carpeting.

In a simple and cost-effective manner, the spacer can also be stamped out of the fitting element as a spacer web part and subsequently bent so as to be approximately surface-parallel to the connection surface. For purposes of improving the appearance and as protection against sharp edges of the fitting element, the latter is advantageously covered with a plastic cap.

In a concrete, advantageous embodiment, the upper section of the plastic cap has a hook profile that covers the fitting element, especially between and next to the legs of the U-shaped bracket element. Furthermore, in the lower section, there is at least one elastic clip element that engages behind the fitting element. In this manner, the plastic cap can be positioned from the top onto the fitting element and can subsequently be easily and quickly clipped into place. Since the fitting element is held at a distance from the support as well as from a layer of carpeting by the spacer block or by the spacer sleeve as well as by the spacer, the plastic cap can be easily put in place and then rests without contact pressure on the fitting element, which prevents the plastic cap from coming loose.

As an alternative, the plastic cap can have a lateral film hinge as a shielding part which can be joined to the fitting element in such a way that the shielding part can be folded over the fitting element after the latter has been installed.

The positioning recess and the screw hole should be arranged on the support in such a way that, in the installed state, the bracket element extends beyond the top of the backrest of the rear seat so that a hook on the child seat, especially a carabiner, can be attached. This place can be under the center headrest of the backrest of a rear seat.

BRIEF DESCRIPTION OF THE DRAWINGS

The invention will be explained in greater detail below the basis of the drawing.

The following is shown.

BRIEF DESCRIPTION OF THE INVENTION

Figure 1:
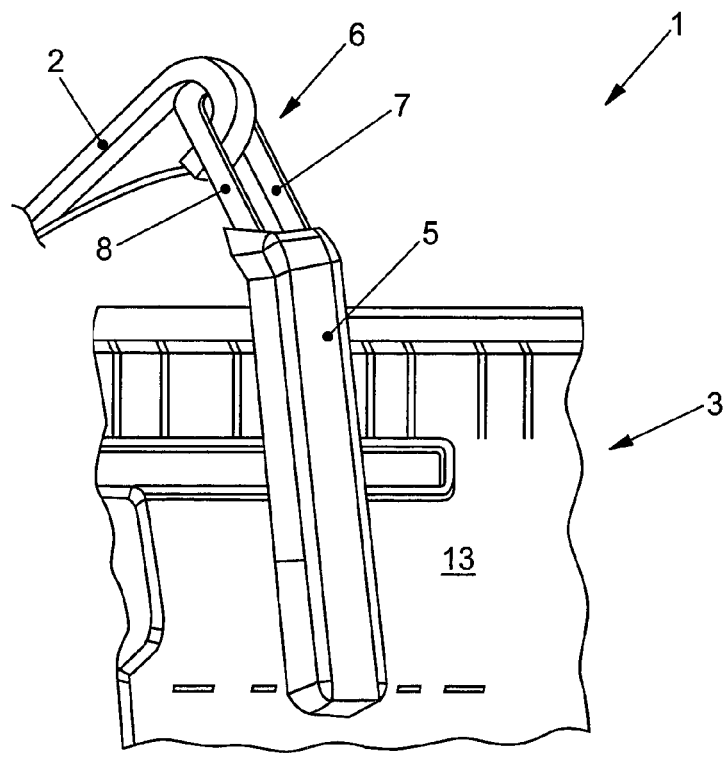
FIG. 1 a view of a fastening device after installation.

FIG. 1 shows a fastening device 1 for a carabiner 2 that is joined to an upper section of a child seat by means of a strap (not shown here) as a so-called top tether. The fastening device 1 is arranged on the back of the backrest of a rear seat 3 and it consists of a one-piece bracket part 4 that is covered by a plastic cap 5.

Figure 2:
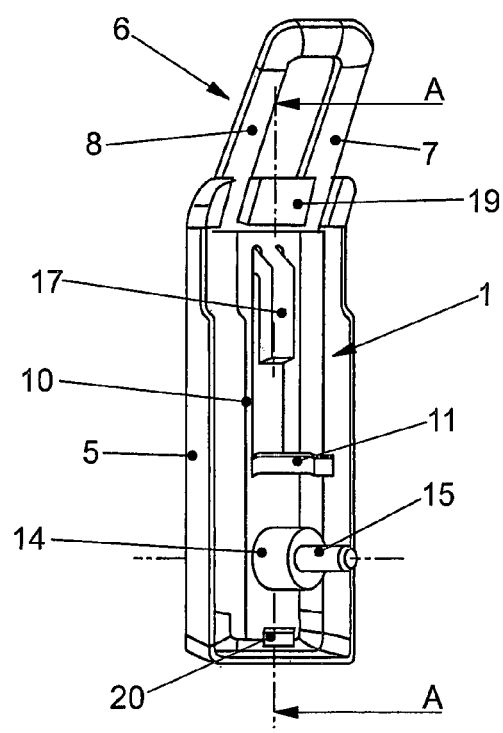
FIG. 2 a perspective view of the connection surface of a one-piece bracket part with a plastic cap put in place.
Figure 3:
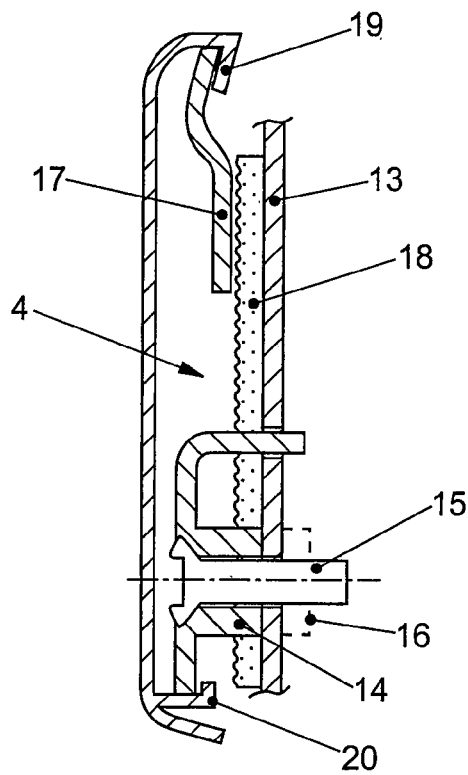
FIG. 3 a sectional view along line A-A from FIG. 2.
Figure 4:
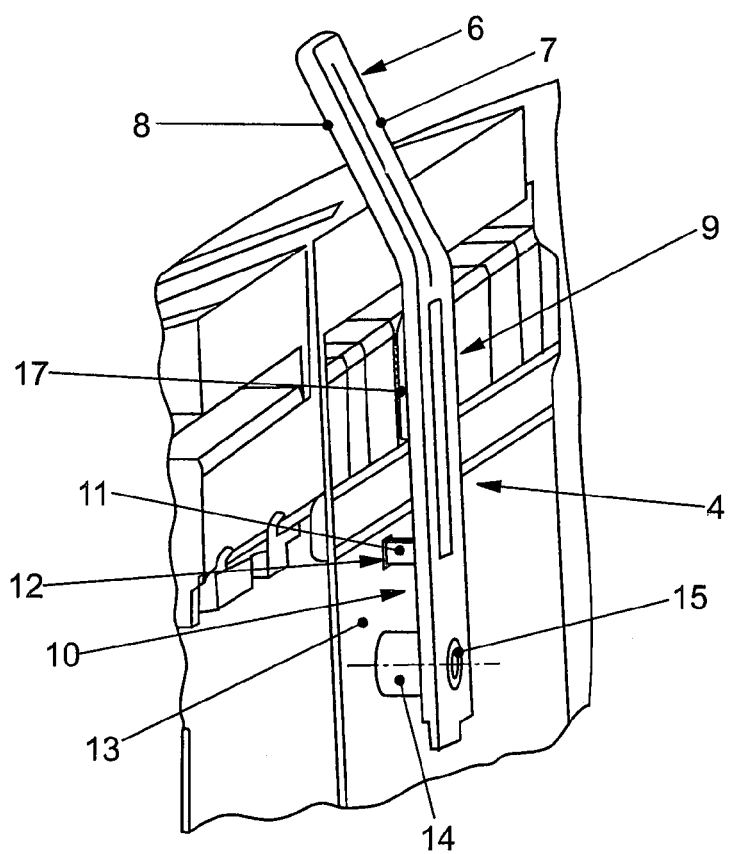
FIG. 4 a perspective view of an installed bracket part without a plastic cap.

As can be seen in FIGS. 2 to 4, the bracket part 4 consists of an upper U-shaped bracket element 6 and a fitting element 9 connected to the U-legs 7, 8 at the bottom.

As can be seen in FIGS. 1 and 4, the bracket element 6 of the bracket part 4 extends beyond the top of the backrest of the rear seat 3, whereby the carabiner 2 is hooked onto the bracket element 6.

The fitting element 9 is a flat-strip metal element with a connection surface 10 that, in the installed state, faces a sheet-metal part of the backrest of the rear seat 3 in the direction of the support 13.

A positioning pin 11 is notched from a lengthwise center area of the fitting element 9 at a right angle, and it is inserted into a rectangular hole 12 on the support 13 for positioning purposes and to provide anti-twist protection.

Moreover, underneath the positioning pin 11, a spacer sleeve 14 is drawn out of the fitting element 9, whereby, as can be especially seen in FIG. 3, the spacer sleeve 14 lies directly against the support 13 and is affixed to the support 13 by means of a screw 15 in the center, optionally with a weld nut 16 (indicated by a broken line).

Moreover, in an upper lengthwise center area on the fitting element 9, a spacer is stamped out as a spacer web part 17 and subsequently bent so as to be surface-parallel to the connection surface 10. As can especially be seen in FIG. 3, the spacer web part 17 lies against a layer of carpeting 18 of the support part 13, so that the spacer web part 17 does not project—by the thickness of the layer of carpeting 18—as far from the connection surface 10 from the connection surface 10 of the fitting element 9 as the contact surface of the spacer sleeve 14 does. In its installed state, the fitting element 9 is covered by the plastic cap 5, whereby, in its upper section, a hook profile 19 is formed that extends beyond the fitting element 9 between and next to the U-legs 7, 8. In the lower section of the plastic cap 5, there is an elastic clip element 20 that engages behind the fitting element 9, so that the plastic cap 5 can be placed from the top onto the fitting element 9 and then pushed down to establish the clip connection.

The invention claimed is:

1. A fastening device for a child seat in a motor vehicle, comprising a one-piece bracket part in the form of a top-tether bracket to be affixed to a support on a backrest of a rear seat, said one-piece bracket part comprising a U-shaped bracket element having U-legs and fitting element connected to the U-legs, wherein the fitting element has a connection surface that faces the support when in the installed state, wherein, projecting from the connection surface in the direction of the support, there is at least one positioning pin that can be inserted into a diameter-adapted positioning recess of the support, and wherein at least one spacer block facing the support is arranged on the connection surface and is offset with respect to the positioning pin, whereby, in the installed state, said spacer block lies against the support, and the fitting element can be screwed to the support through said spacer block.

2. The fastening device according to claim 1, wherein the fitting element is a flat-strip metal element out of which the positioning pin has been notched from a lengthwise center area with a rectangular diameter so as to extend approximately at a right angle, and so that it can be inserted into a matching rectangular hole on the support as an anti-twist protection.

3. The fastening device according to claim 2, wherein the spacer block is drawn out of the fitting element as a spacer sleeve and can be affixed by means of a screw in the center.

4. The fastening device according to claim 1, wherein, when in the installed state, the spacer block is located below the positioning pin.

5. The fastening device according to claim 1, wherein a spacer is arranged on the fitting element on the connection surface in the upper section next to the bracket element, whereby said spacer does not project as far from the connection surface as the spacer block does and, in the installed state, this spacer lies against a layer of carpeting on the support, so that, when the entire fitting element is in its installed state, it is held at a distance from the support and from a layer of carpeting.

6. The fastening device according to claim 5, wherein the spacer is also stamped out of the fitting element as a spacer web part and subsequently bent so as to be approximately surface-parallel to the connection surface.

7. The fastening device according to claim 1, wherein the support is a rear sheet-metal part of the backrest of the rear seat.

8. The fastening device according to claim 1, wherein the fitting element is covered with a plastic cap.

9. The fastening device according to claim 8, wherein an upper section of the plastic cap has a hook profile that covers the fitting element, between and next to the legs of the U-shaped bracket element as well as, in the lower section, at least one elastic clip element that engages behind the fitting element.

10. The fastening device according to claim 8, wherein the plastic cap has a lateral film hinge as a shielding part which can be joined to the fitting element in such a way that the shielding part can be folded over the fitting element after the latter has been installed.

11. The fastening device according to claim 1, wherein the positioning recess and the screw hole are arranged on the support in such a way that, in the installed state, the bracket element extends beyond the top of the backrest of the rear seat so that a hook on the child seat can be attached.

\* \* \* \* \*